Dec. 24, 1963     ROKU YASUI     3,115,159
TORUS VALVE

Filed July 28, 1960     3 Sheets-Sheet 1

Roku Yasui
Inventor
by Porter, Chittick + Russell
Attorneys

Dec. 24, 1963  ROKU YASUI  3,115,159
TORUS VALVE

Filed July 28, 1960  3 Sheets-Sheet 2

Roku Yasui
Inventor
by Porter, Chittick + Russell
Attorneys

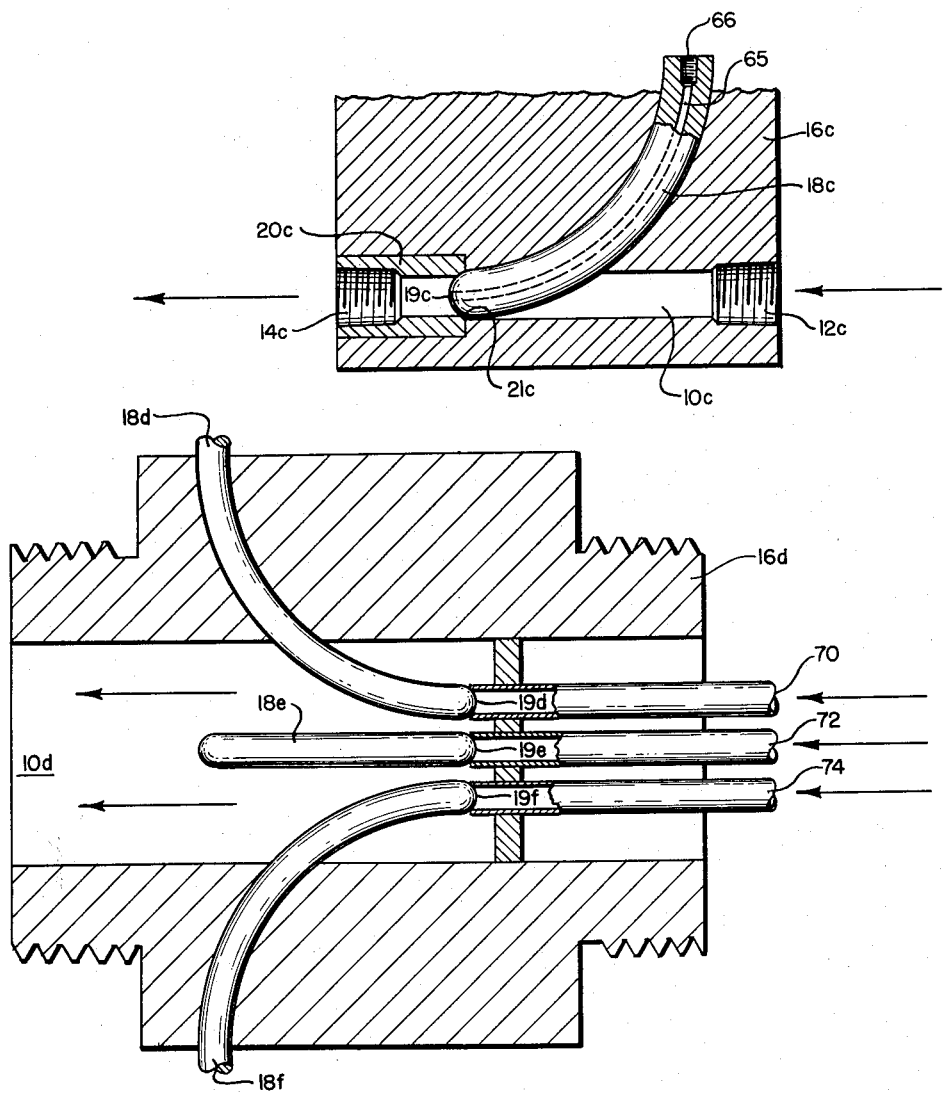

United States Patent Office 3,115,159
Patented Dec. 24, 1963

3,115,159
TORUS VALVE
Roku Yasui, 65 Ellery St., Cambridge 38, Mass.
Filed July 28, 1960, Ser. No. 45,826
7 Claims. (Cl. 137—606)

This invention relates to valves and more particularly to a torus or toroidal-shaped valve for use in fluid pipe lines.

A large variety of valves is produced by manufacturers to fulfill specific operational requirements. However, most of these valves have disadvantageous characteristics and limitations, and cannot be used in many specific situations. Tight shut-off in conventional valves is usually obtained by means of either restricting or changing the direction of flow of fluid therein. The inside configurations of the majority of these valves are such that some liquid is retained within the valves upon suspension of flow in the lines, or the inside passageways are tortuous and restricted. There is trapping and pressure drop in the flow.

I have sought to overcome the defects, disadvantages and limitations of previous valve devices with my torus-shaped valve. My torus valve eliminates trapping, and is thus a significant development, for with accelerated developments in technology, the need for a valve which eliminates trapping and permits free-flowing and tight-sealing has arisen. This is particularly true in the fields of missiles, high energy fuels, nuclear energy and cyrogenics. For example, in piping monopropellants such as highly concentrated hydrogen peroxide, trapping is to be scrupulously avoided. Upon prolonged contact with all common metals except pure aluminum, hydrogen peroxide reacts in the form of a violent exothermic reaction, producing some five thousand times its original volume in steam and oxygen. Even in more common fields such as food and pharmaceutical processing, trapping at the point of dispensing has caused problems in contamination and bacteria control.

The specific advantages of my torus valves are that they eliminate trapping and permit straight line, free-flowing and tight-sealing of the fluid, and accurate and precise regulation of the flow from maximum flow down to $\frac{1}{600}$ of maximum flow. Other advantages obtained by my torus valve are versatility, durability, simplicity, precise metering and ease in cleaning. Variations permit nearly a limitless number of advantageous features and applications.

Other advantages of my torus valve will appear in the following specification and drawings, in which:

FIG. 4 is a vertical cross-section of a third modification whereby two liquids can be mixed, one coming into the flow pipe through the torus-shaped valve plunger, and FIG. 5 is a vertical cross-section of a fourth modification utilizing multiple torus valves, whereby a number of liquids can be mixed.

Figure 1:
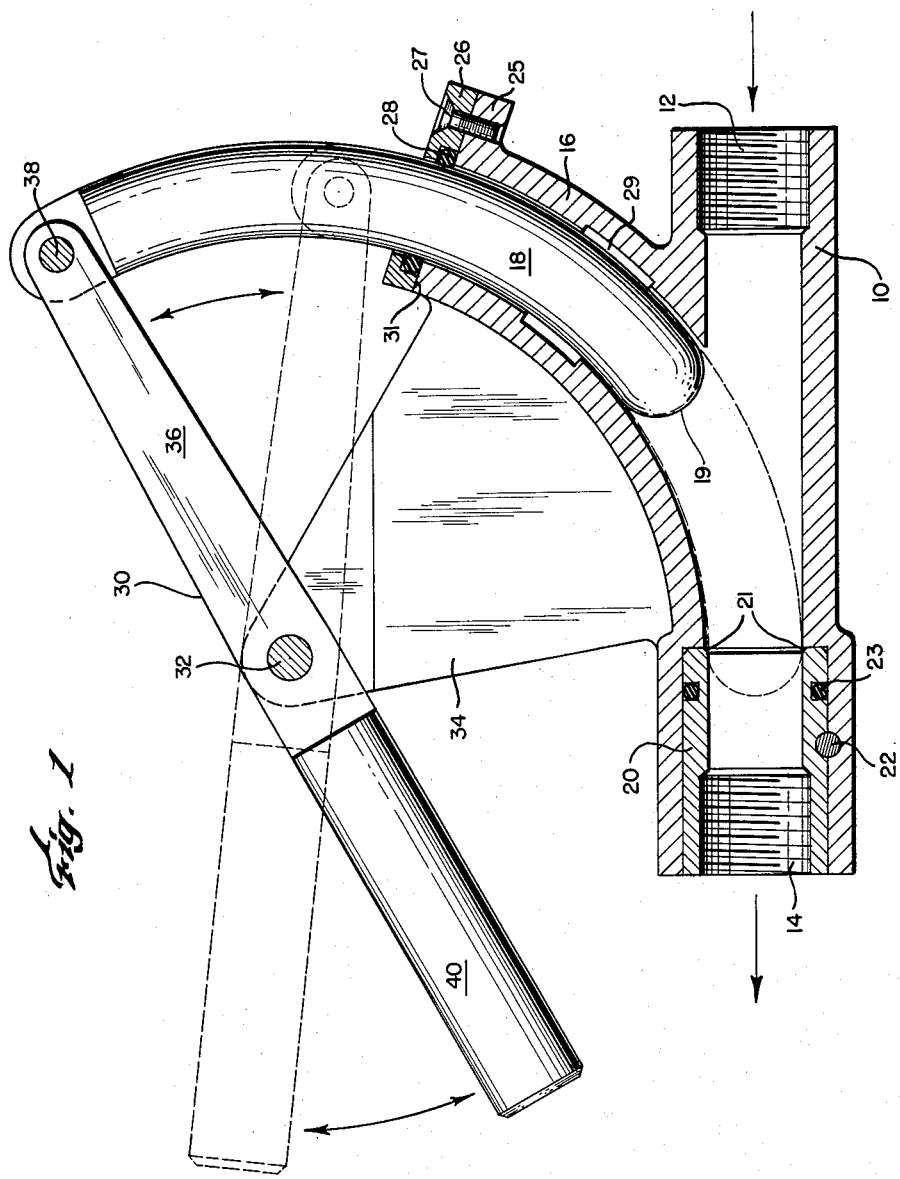
FIG. 1 is a vertical cross-section of the basic valve.

In the drawings 10 represents tubular flow pipe. Said flow pipe 10 has an inlet port 12 and outlet port 14, and is designed to be attached to a pipe of suitable standard diameter at both ports by means of suitable threaded ends, or other suitable means. Flow pipe 10 is tangentially intersected by valve casing 16 arcuately shaped in its interior dimension, which guides the toroidal shaped valve plunger or plug 18 in an arcuate path therein and thus tangentially intersecting said flow pipe 10 to control the flow of fluid therethrough. As noted in FIG. 1, pipe 10 and valve casing 16 are preferably an integral casting.

A removable tubular valve seat 20 fits into an inner recess at the outlet port 14 of flow pipe 10, and preferably has interior diameter slightly smaller than that of flow pipe 10. The valve edge 21 of valve seat 20 is conically tapered or beveled so as to receive the rounded or tapered end 19 of torus plunger 18. Any misfitting at said valve edge 21 which would permit leakage is taken up as the end 19 of the torus plunger 18 moves into tight position when the torus plunger 18 is activated to close off the flow of liquid in flow pipe 10.

Valve seat 20 is readily replaceable by removing tapered pin or threaded screw 22 and sliding said valve seat 20 out of flow pipe 10. An O-ring 23 or other suitable gasket lies around the outer surface of valve seat 20 in a suitable circumferential groove to seal and prevent any seepage of liquid between flow pipe 10 and valve seat 20.

The torus valve plunger 18 is a solid torus or arc-segment made to conform and fit into the hollow arcuately-shaped passage in valve casing 16 and to be movable therein. The diameter of said torus plunger 18 is slightly less than the interior diameter of flow pipe 10 to permit its movement therein. The valve end 19 of torus plunger 18 is spherical or rounded to insure a tight fit when said torus 18 is moved into contact with edge 21 of valve seat 20. However, it will be understood that end 21 of torus 18 may be tapered or varied in shape to facilitate varying flow characteristics.

The top portion 25 of hollow valve casing 16 is enlarged to receive a sealing plate 26 attached by screws 27 or other suitable means. The interior surface 31 of sealing plate 26 is grooved to receive a suitable gasket 28 therein to prevent seepage between torus 18 and valve casing 16. In the interior surface of said valve casing 16 is an annular groove 29 provided to prevent leakage of fluid along torus 18 and through sealing plate 27.

Means is provided for acuating the torus plunger 18 toward the valve seat 20 in response to conditions being controlled (which in FIG. 1 is shown as a pivoted handle 30), which may be operated manually, or automatically by any suitable motive source, such as a solenoid, hydraulic cylinder, rotary actuator, as well as digital and analogue control sensor-actuators.

As shown in FIG. 1, handle 30 is pivotally mounted on pivot 32 on flat bracket member 34 in turn fixed on valve body or casing 16. The inner end 36 of handle 30 is pivotally attached to the upper end of torus plunger 18 on pin 38. It will be understood that the outer end 40 of handle 30 is actuated manually, or automatically from suitable motor sources operating in response to conditions being controlled. It will be understood that pivot 32 on which handle 30 is mounted is the center of the arc-segment comprising the torus valve 18. Thus pivoted handle 30 is used to activate torus 18 in an arcuate movement towards and away from valve seat 20 to vary the amount of flow of fluid through flow pipe 10 in response to conditions being controlled.

Figure 2:
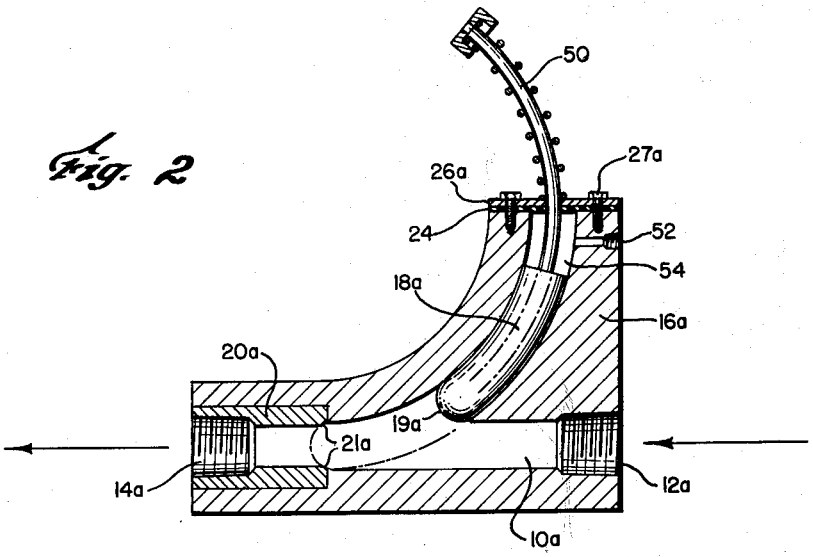
FIG. 2 is a vertical cross-section of a modification hydraulically activated and utilizing a return spring.

In FIG. 2 I have shown a modification of my torus valve, hydraulically actuated and utilizing a return spring. Basically the valve mechanism is the same as that described in FIG. 1. But torus valve 18a is mounted on an arcuate rod 50 having the same radius of curvature as torus valve 18a which passes through sealing plate 26a mounted on sealing gasket 24 on the top of valve body 16a, and secured thereto by screws 27a. An opening 52 leads into head space 54 provided above the top of torus valve 18a, and torus valve 18a is actuated by means of pressurized hydraulic fluid entering head space 54 through the port 52. A coil spring surrounding curved rod 50 acts to return torus valve 18a to open position when the actuating hydraulic pressure is relieved.

Figure 3:
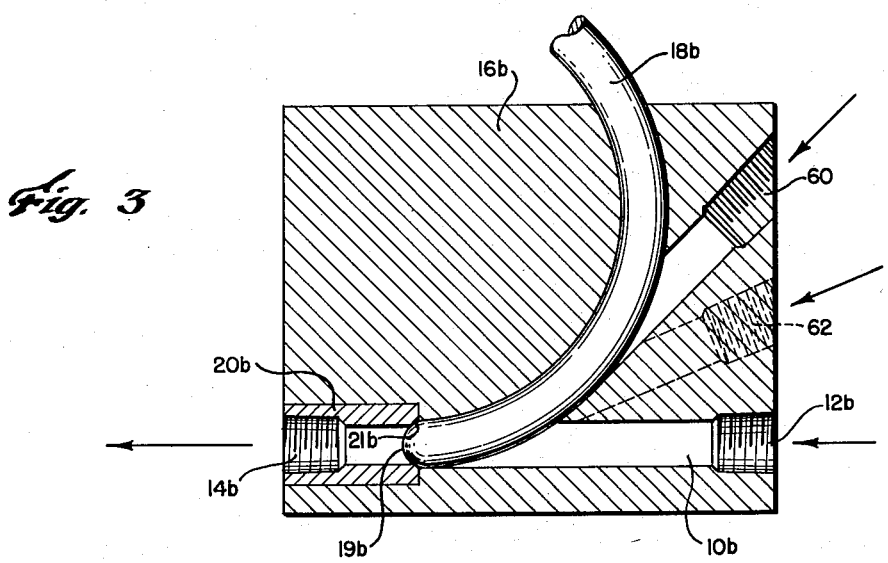
FIG. 3 is a vertical cross-section of a second modification utilizing multiple inlet ports and a single torus valve, whereby a number of liquids can be mixed.

In FIG. 3 I have shown a second modification of my torus valve utilizing multiple inlet ports, whereby a number of liquids or fluids can be mixed. As shown therein a torus valve 18b tangentially intersects the main fluid pipe line 10b, to engage valve seat 21b. Inlet ports 60 and 62 are also arranged to discharge liquid or fluid into the main pipe line 10b, also controlled by torus valve 18b, as the latter blocks and shuts off the discharge end of said ports 60 and 62. Thus additional liquids or fluids can be intermixed with the fluid in the main pipe line 10b as desired.

In FIG. 4 I show a third modification of my torus valve, wherein two liquids can be mixed, one flowing through the flow pipe and the other introduced through the torus-shaped valve plunger. In FIG. 4, 10c represents the flow pipe, 16c the valve body or casing, 18c the torus valve and 20c the valve seat. 65 is a hollow channel extending longitudinally through the center of torus valve plug 18c, through which a second fluid may be introduced through inlet port 66 into the full stream, either before or after the torus valve plug is seated against its valve seat.

In FIG. 5 I have shown a fourth modification of my torus valve principle, utilizing multiple torus valves whereby a number of liquids can be mixed into a common flow stream. As shown in FIG. 5 this modification comprises the central flow stream 10d, the valve body 16d and separate pipes 70, 72 and 74 discharging into the common flow stream 10d. The outlet ends of the said separate pipes 70, 72 and 74 constitute valve seats, against which separate torus valves 18d, 18e and 18f respectively, may be caused to seat, thus regulating the flow of fluid through said separate pipes 70, 72 and 74. In FIG. 5 it will be noted that the torus valves 18d, 18e and 18f move to close off said pipes in a direction opposite to that of the flow of fluid therethrough. It will be understood that in the several modifications shown in FIGS. 1 to 5 inclusive that the movement of the torus valve plug may be either in the direction of the flow of fluid through the flow pipe or opposite to it.

An important advantage of my torus valve is that it may readily be withdrawn from the valve casing and the valve in the flow pipe readily cleaned, without dismantling, as is required in other valves. Also it will be understood that the actuating handle 30, as in FIG. 1, may be reversed in being pivoted at one end on pivot 32, connected to the upper end of torus plunger 18 on pin 38, with the operating portion of the handle extending rearwardly from left to right, without departing from my basic torus valve shown in FIG. 1.

I claim:

1. In combination with a tubular flow pipe having a valve seat therein, a valve for regulating the flow of fluid through said pipe, comprising a solid torus-shaped cylindrical plug movable in an arcuate path toward said valve seat and tangentially intersecting said fluid flow pipe, said plug being of substantially the same diameter as the flow pipe and having the same diameter throughout its length, a valve casing mounted on said flow pipe and guiding said plug in its arcuate path of movement toward said valve seat, and means associated with said valve casing for moving said plug toward and away from its valve seat whereby the full cross-sectional diameter of the plug is utilized to regulate the flow of fluid through said pipe.

2. A device according to claim 1, in which said means for moving said torus-shaped plug toward and away from its valve seat comprises a handle pivotally mounted at the center of the arcuate path of movement of said torus-shaped valve plug.

3. A device according to claim 1, in which said means for moving said torus-shaped plug toward and away from its valve seat includes hydraulic means for moving said torus-shaped plug toward its valve seat, an arcuate rod on the upper end of said plug, and spring means thereon for moving said plug away from said valve seat.

4. A device according to claim 1, in which said valve casing includes one or more channels for introducing other fluids whose flow into said flow pipe is controlled by said torus-shaped plug.

5. A device according to claim 1, in which said torus-shaped valve plug includes a central channel and an inlet port for introducing a second fluid into said flow pipe.

6. In combination with a common tubular flow pipe, a plurality of pipes having ports discharging thereinto, a plurality of valve means for separately regulating the flow of fluids from said discharge pipes into said flow pipe comprising a solid torus-shaped cylindrical plug movable in an arcuate path toward and away from the discharge port of each of said pipes in response to conditions being controlled, said plug being of substantially the same diameter as the discharge port of each of said pipes and of the same diameter throughout its length and valve casings for separately guiding each torus-shaped plug in an arcuate path toward and away from the discharge port of its respective pipe.

7. In combination with a flow pipe having a valve seat therein, a valve for regulating the flow of fluid through said pipe, comprising a solid plug movable in an arcuate path toward said valve seat and tangentially intersecting said fluid flow pipe, said plug having the configuration of a segment of the enclosed solid generated by the revolution of a section substantially identical to the cross-section of said flow pipe about an axis corresponding to the axis of the above recited arcuate path, a valve casing mounted on said flow pipe and having an elongated arcuate recess adapted to receive said plug for guiding said plug in its arcuate path of movement toward said valve seat and means associated with said valve casing for moving said plug toward and away from its valve seat whereby the full cross-section of the plug is utilized to regulate the flow of fluid through said pipe.

References Cited in the file of this patent

UNITED STATES PATENTS

| | | |
|---|---|---|
| 871,320 | Bollee | Nov. 19, 1907 |
| 895,668 | Newman | Aug. 11, 1908 |
| 1,367,864 | Clarkson | Feb. 8, 1921 |
| 2,188,216 | Beecher | Jan. 23, 1940 |
| 2,915,087 | Kruschik | Dec. 1, 1959 |
| 2,953,165 | Reynolds | Sept. 20, 1960 |

FOREIGN PATENTS

| | | |
|---|---|---|
| 969,291 | France | May 17, 1950 |
| 858,177 | Germany | Dec. 4, 1952 |